(12) United States Patent
Kraatz et al.

(10) Patent No.: US 10,919,198 B2
(45) Date of Patent: Feb. 16, 2021

(54) PRODUCTION OF COMPLEX HOLLOW FOAM OR SANDWICH STRUCTURES BY MEANS OF A MOLD CORE

(71) Applicant: Evonik Operations GmbH, Essen (DE)

(72) Inventors: Arnim Kraatz, Darmstadt (DE); Denis Holleyn, Hofheim am Taunus (DE)

(73) Assignee: Evonik Operations GmbH, Essen (DE)

( * ) Notice: Subject to any disclaimer, the term of this patent is extended or adjusted under 35 U.S.C. 154(b) by 24 days.

(21) Appl. No.: 15/769,778

(22) PCT Filed: Oct. 17, 2016

(86) PCT No.: PCT/EP2016/074825
§ 371 (c)(1),
(2) Date: Apr. 20, 2018

(87) PCT Pub. No.: WO2017/067867
PCT Pub. Date: Apr. 27, 2017

(65) Prior Publication Data
US 2018/0311869 A1 Nov. 1, 2018

(30) Foreign Application Priority Data
Oct. 22, 2015 (EP) .................................... 15191005

(51) Int. Cl.
| | |
|---|---|
| *B29C 44/14* | (2006.01) |
| *B29C 44/12* | (2006.01) |
| *B29C 44/44* | (2006.01) |
| *B29C 33/48* | (2006.01) |
| *B29L 31/30* | (2006.01) |
| *B29C 33/54* | (2006.01) |
| *B29C 33/38* | (2006.01) |
| *B29L 31/52* | (2006.01) |
| *B29K 709/08* | (2006.01) |
| *B29K 67/00* | (2006.01) |
| *B29K 75/00* | (2006.01) |
| *B29K 705/00* | (2006.01) |
| *B29K 671/00* | (2006.01) |
| *B29K 23/00* | (2006.01) |
| *B29L 31/08* | (2006.01) |
| *B29K 79/00* | (2006.01) |
| *B29L 31/44* | (2006.01) |
| *B29K 27/06* | (2006.01) |
| *B29K 105/04* | (2006.01) |

(52) U.S. Cl.
CPC ............ *B29C 44/14* (2013.01); *B29C 33/485* (2013.01); *B29C 44/1252* (2013.01); *B29C 44/1266* (2013.01); *B29C 44/445* (2013.01); *B29C 33/3821* (2013.01); *B29C 33/54* (2013.01); *B29C 44/129* (2013.01); *B29C 44/1233* (2013.01); *B29C 44/1271* (2013.01); *B29K 2023/06* (2013.01); *B29K 2023/12* (2013.01); *B29K 2027/06* (2013.01); *B29K 2067/003* (2013.01); *B29K 2075/00* (2013.01); *B29K 2079/08* (2013.01); *B29K 2105/048* (2013.01); *B29K 2671/00* (2013.01); *B29K 2705/00* (2013.01); *B29K 2709/08* (2013.01); *B29K 2995/0063* (2013.01); *B29L 2031/085* (2013.01); *B29L 2031/30* (2013.01); *B29L 2031/44* (2013.01); *B29L 2031/52* (2013.01); *Y02P 70/50* (2015.11)

(58) Field of Classification Search
CPC ... B29C 44/14; B29C 33/485; B29C 44/1252; B29C 44/1266; B29C 44/445; B29C 40/0453; B29C 44/1219; B29C 48/0012; B29C 33/0016; B29C 44/08; B29C 44/1228; B29C 44/1233; B29C 44/206; B29C 44/26; B29C 44/3461; B29C 30/0016; B29C 2043/3647; B29C 2043/3649; B29C 66/1459; B29C 66/81459
See application file for complete search history.

(56) References Cited

U.S. PATENT DOCUMENTS

| | | |
|---|---|---|
| 3,963,816 A | 6/1976 | Smith |
| 4,187,353 A | 2/1980 | Schroeder |
| 4,740,530 A | 4/1988 | Pip |

(Continued)

FOREIGN PATENT DOCUMENTS

| | | |
|---|---|---|
| CN | 100420702 C | 9/2008 |
| DE | 1 966 325 A1 | 6/1972 |

(Continued)

OTHER PUBLICATIONS

U.S. Appl. No. 14/402,446, filed Nov. 20, 2014, 2015/0151496 A1, Kraatz, A. et al.

(Continued)

*Primary Examiner* — Stella K Yi
(74) *Attorney, Agent, or Firm* — Oblon, McClelland, Maier & Neustadt, L.L.P.

(57) ABSTRACT

The invention relates to a process for producing complex, mould-foamed rigid foam materials, more particularly of poly(meth)acrylimide (P(M)I) cores, preferably of polymethacrylimide (PMI) cores, which may be employed, for example, in carmaking or aircraft construction. A feature of the process is that through use of a particulate core during foam, it is possible to achieve an additional weight saving relative to foam materials or sandwich materials of the prior art.

18 Claims, No Drawings

(56) References Cited

U.S. PATENT DOCUMENTS

| | | |
|---|---|---|
| 5,492,660 A | 2/1996 | Vyletel et al. |
| 2009/0309268 A1 | 12/2009 | Cavaliere et al. |
| 2013/0003972 A1 | 1/2013 | Kang et al. |
| 2016/0001476 A1 | 1/2016 | Sommer et al. |
| 2016/0332344 A1 | 11/2016 | Bernhard et al. |

FOREIGN PATENT DOCUMENTS

| | | | |
|---|---|---|---|
| DE | 27 26 260 C2 | | 5/1983 |
| DE | 36 30 930 A1 | | 3/1988 |
| DE | 10203225132 | * | 12/2013 |
| DE | 10 2013 225 132 A1 | | 6/2015 |
| DE | 10 2014 209 425 A1 | | 11/2015 |
| FR | 500.250 | | 3/1920 |
| FR | 2 631 278 A1 | | 11/1989 |
| GB | 126900 | | 5/1919 |
| JP | 61-202827 A | | 9/1986 |
| JP | S63203323 A | * | 2/1987 |
| JP | 63-203323 A | | 8/1988 |
| JP | 8-142060 A | | 6/1996 |
| WO | WO 95/14563 A1 | | 6/1995 |
| WO | WO 2013/005947 A2 | | 1/2013 |
| WO | WO 2014/128214 A1 | | 8/2014 |

OTHER PUBLICATIONS

U.S. Appl. No. 14/416,777, filed Jan. 23, 2015, 2015/0174798 A1, Pinto, J. et al.

U.S. Appl. No. 15/032,927, filed Apr. 28, 2016, 2016/0288431 A1, Buehler, S. et al.

U.S. Appl. No. 15/100,538, filed May 31, 2016, 2016/0332344 A1, Bernhard, K. et al.

U.S. Appl. No. 15/321,845, filed Dec. 23, 2016, 2017/0136665 A1, Bernhard, K. et al.

U.S. Appl. No. 15/522,050, filed Apr. 26, 2017, 2017/0334155 A1, Buehler, S. et al.

International Search Report dated Apr. 25, 2017, in PCT/EP2016/074825, filed Oct. 17, 2016.

* cited by examiner

PRODUCTION OF COMPLEX HOLLOW FOAM OR SANDWICH STRUCTURES BY MEANS OF A MOLD CORE

FIELD OF THE INVENTION

The invention relates to a process for producing complex, mould-foamed rigid foam materials, more particularly of poly(meth)acrylimide (P(M)I) cores, preferably of polymethacrylimide (PMI) cores, which may be employed, for example, in carmaking or aircraft construction. A feature of the process is that through use of a particulate core during foaming, it is possible to achieve an additional weight saving relative to foam materials or sandwich materials of the prior art.

PRIOR ART

Employed nowadays for numerous lightweight-construction applications are core materials based on rigid foams. In the majority of cases these materials are joined to outer layers composed, for example, of carbon fibre-reinforced or glass fibre-reinforced composite materials, metals or wood, so as to construct a sandwich component. In many cases, sandwich components provide the best trade-off between weight and mechanical properties. In the case of components of very high volume, as in the case of complex three-dimensional structures of great thickness, for example, or else depending on the prevailing stress load affecting the component, however, it may be the case that the core material is not needed completely in the final application. In these cases, the core material serves in particular as a manufacturing aid, which makes an unnecessary additional weight contribution to the final component.

For the production of hollow fibre composite structures, wax cores are used in small production runs. In this case, fibre composite materials are applied to wax cores and consolidated in various infusion processes, and finally the wax core is removed. On account of the wax cores, however, the processing procedures are limited to low temperatures and low pressures, and the removal of the wax core has proved to be a highly complex process step. As a result, the cycle times in processing are very long. Accordingly it is possible to realize only very small production runs. A process of this kind is not suitable for producing foams having a cavity. Melting within a foam core is ruled out simply because of the diffusion into the pores. Alternatively, the wax core would have to be removed via an extensive cut-out, which in turn would lead to reduced stability on the part of the foam core.

Provided below is an overview of the production of P(M)I foam materials and sandwich materials. These processes are easily transposed to other rigid foam materials, such as PE, PP, PU, PET or PVC foams, for example.

DE 27 26 260 describes the production of poly(meth) acrylimide foams (P(M)I foams) which have excellent mechanical properties that are retained at high temperatures. The foams are produced by the casting process, i.e. the monomers and additional substances required are mixed and polymerized in a chamber. In a second step, the polymer is foamed by heating. This process is very complicated and is difficult to automate.

DE 3 630 930 describes another process for the foaming of the abovementioned copolymer sheets made of methacrylic acid and methacrylonitrile. Here, the polymer sheets are foamed with the aid of a microwave field, and this is therefore hereinafter termed the microwave process. A factor that must be taken into account here is that the sheet to be foamed, or at least the surface thereof, must be heated in advance up to or above the softening point of the material. Since, of course, under these conditions the material softened by the external heating also begins to foam, the foaming operation cannot be controlled solely by the effect of a microwave field, but instead must also be co-controlled from outside by accompanying heating. This means that a microwave field is added to the normal single-stage hot-air process in order to accelerate foaming. However, the microwave process has proved to be too complicated and therefore of no practical relevance and has never been used.

Alongside PMI foams, there are other known foams based on methacrylic acid and acrylonitrile (PI foams) with similar properties. These are described by way of example in CN 100420702C. However, again these foams are produced from sheets.

Alongside these processes which start from an unfoamed polymer sheet, there are also known "in-mould foaming" processes starting from granules. However, in principle these have a number of disadvantages in comparison with the processes described. A non-uniform pore structure is achieved, which exhibits differences between the interior of the original particles and the boundaries between the original particles. The density of the foam is moreover inhomogeneous because of non-uniform distribution of the particles during the foaming process—as previously described. These products foamed from granulate can moreover be observed to have relatively poor cohesion at the boundaries that form between the original particles during foaming, and therefore have poorer mechanical properties than materials foamed from a semifinished sheet. WO 2013/05947 describes an in-mould process in which at least the latter problem has been solved in that, before the particles are charged to the shaping and foaming mould they are coated with an adhesion promoter, e.g. with a polyamide or with a polymethacrylate. Very good adhesion at the grain boundaries is thus achieved. However, this method does not eliminate the non-uniform pore distribution in the final product.

However, there has to date been very little description of in-mould foaming for rigid foams, in particular for P(M)I foams. In contrast, processes of this type have been known for a long time for other foam materials: polyurethane foams are produced from an appropriate reactive liquid, mostly at room temperature. Foams made of PE, PP, polystyrene or polylactic acid (PLA) are produced from granules in an in-mould foaming process.

The German Patent Application file reference 102014209425.9 discloses a process in which P(M)I granules are foamed thermally in a two-shell compression mould with cavities which conform to the shape and which are used for both heating and cooling. This process represents a significant efficiency increase over the prior art. However, since both heating, and therefore foaming, and cooling take place in the same mould the mould is still always occupied for a relatively long time, and there is therefore also still always a relatively long production cycle time. Furthermore, there are still always discernible density gradients in the resultant foam core, resulting from outside-to-inside temperature gradients within the material to be foamed.

PROBLEM

Against the background of the prior art discussed, therefore, a problem addressed by the present invention was that of providing a new process with which high-volume, complex-shaped rigid foam cores or sandwich components can be realized with a final weight reduced relative to the prior art, using the production operations already established for the components.

A particular problem addressed by the present invention was to use this process to carry out simple and high-throughput-rate processing of rigid foam beads, more particularly P(M)I beads, in an in-mould-foaming operation to give moulded rigid foam cores or to give sandwich materials, the intention being that these should have an additionally significantly reduced weight relative to the prior art.

A further problem addressed by the present invention was that of providing a process for in-mould foaming of P(M)I that leads to end products having an internal cavity and at the same time a very uniform density distribution and narrow pore size distribution within the foam.

A problem addressed more particularly was that this process, in comparison to processes of the prior art, be operable with short cycle times and lead to rigid foam cores in the final geometry without particular reworking.

Other problems not explicitly discussed at this point can be derived from the prior art, the description, the claims or the working examples.

In the context of the present text, the wording "poly(meth)acrylimide" (P(M)I) refers to polymethyacrylimides, polyacrylimides or mixtures thereof. Corresponding considerations apply to the corresponding monomers such as (meth)acrylimide and (meth)acrylic acid. By way of example, the term (meth)acrylic acid means not only methacrylic acid but also acrylic acid or else a mixture of both.

SOLUTION

The problems identified are solved by the provision of an innovative process for producing complex rigid foam cores, these being more preferably rigid poly(meth)acrylimide (P(M)I) foam cores. The term "rigid foam core" here encompasses, generically, foam bodies without outer layers, in particular but not necessarily comprising rigid foams, and foam cores, in composite materials or sandwich materials.

This process of the invention comprises the following process steps:
a. producing a filling core, filled with particles and consisting of a foil,
b. inserting the filling core into a mould and then closing the mould,
c. introducing pre-foamed or unfoamed matrix particles into the cavity between the filling core and the inside wall of the mould,
d. foaming the matrix particles, opening the mould, and withdrawing the rigid foam core,
e. optionally opening the foil at the accessible former contact region from process step b., and
f. withdrawing the particles from the rigid foam core.

There are different variants, affecting the overall operation, in particular of the insertion of the filling core in process step b. The three most important variants here are as follows:

In a first variant, the filling core in process step b. is inserted into the mould in such a way that the filling core contacts between 0.5 and 10, preferably 1 to 5, area percent of the inside wall of the mould. In this case the opening may for example be simply introduced hanging. In the case of this variant, there is generally no need for process step e., and the withdrawal of the particles in process step f. is at its most simple.

In a second variant, in process step b. the filling core is inserted such that the filling core after process step d. is completely surrounded by the foam. For this purpose, for example, the filling core can be suspended from a thread into the mould. With this variant of the present invention, the foam in process step e. is partially drilled open or cut open. This is done in order for the particles then to be withdrawn in process step f. Obtained as a result is a foam body whose cavity may be enveloped almost entirely by the foam. The size of the subsequent opening is dependent on the particle size and on the capacity for free flow, and also, possibly, on the shape of the cavity and the desired withdrawal time for the particles.

In a third variant of the process of the invention, the filling core in process step b. is inserted in such a way that the filling core contacts between 0.5 and 10, preferably 1 to 5, area percent of the inside wall of the mould. This location is additionally closed with an easily removable means. This means may be, for example, a bung or a clip. This means is finally removed in process step e. Following the withdrawal of the particles, the means may optionally be used again and in that case may be fastened for example by adhesive bonding or stitching.

Regarding process steps a. and b.: As far as the particles are concerned, they are to be selected such that they remain free-flowing up to a temperature which corresponds to the maximum foaming temperature employed. Free-flowing here means that the particles can be returned to a free-flowing state using only low levels of mechanical energy, such as shaking, pushing or poking, for example. At the stated foaming temperature and superatmospheric pressure, even under prolonged loading, the particles are preferably also stable chemically, undergo only a slight change in volume, and do not melt or do not stick to one another.

Particularly suitable particles here are sand, or polymer particles which are solid and stable at the foaming temperature, composed of PEEK, for example, or metal particles or glass beads. Also conceivable, however, are other fillers, primarily mineral fillers, or else temperature-stable seeds.

The foil ought in accordance with the invention to be a foil with just the same analogous temperature stability. Examples thereof are PTFE, PEEK or PPSU foil. Also conceivable is the use of a foil impregnated or coated with metals or with silicone, for example. With such foils, the coating or impregnation may also be of a paper or fabric support material.

The filling core is preferably in a tightly packed and therefore dimensionally stable form. The filling may take place for example by means of compressed air or inward suction under subatmospheric pressure. For compaction, pressure may additionally be applied to the outside, in a press, for example. This may optionally also be accompanied by shaping of the filling core. The shaping may also take place and/or be assisted by the subatmospheric and/or superatmospheric pressure. After the filling has taken place, the foil may either be sealed to form a closed pouch or remain open at the filling location, and can be introduced, with this filling location pointing upward, into the mould. Preferably the filling core is open at one location and at this open location is placed hanging into the mould in process step b.

In one particular embodiment of the above-recited first or third variant, the filling core in process step b. is inserted into the mould in such a way that it contacts the inside wall of the mould at not less than two locations. In this case the second location, which does not point upward within the mould, is necessarily closed. With a procedure of this kind it is then possible for the particles in process step f. to be blown out of the cavity by means of compressed air. For this purpose, the location, or the second location, accessible on the surface of the rigid foam core must be opened.

Regarding process steps c. and d.: in principle, all known processes for producing bead foams can be integrated into the process of the invention. Having proved to be particularly preferable is a process in which the actual foaming takes place with release of pressure from the mould interior. A process of this kind is described for P(M)I, in international application PCT/EP2015/064316. This process will briefly be implemented hereinafter as an exemplary implementation of process steps c.

and d. of the present process. To the skilled person it is clear here that, as stated, other bead foams and/or other bead foaming processes can also be employed in process steps c. and d. Therefore, the implementations below should be considered to be a preferred embodiment of the process of the invention:

In a preferred partial foaming process of this kind, the matrix particles are preheated in a process step c0. and are introduced under pressure into the mould. Foaming then takes place at the foaming temperature by lowering of the pressure.

In this embodiment, process steps c. and d. have the following individual steps:

c0: heating of matrix particles to an atmospheric-pressure foaming temperature $T_1$, which takes place under a pressure $p_1$, wherein there is an increase in volume of the P(M)I particles of not more than 10 vol % in 10 minutes, c1: introduction of the matrix particles into the cavity formed of filling core and inside of the mould, the introduction taking place at a pressure $p_2$, which is preferably not more than 10% lower than $p_1$, followed by closing of the mould, d1: release of pressure in the mould interior to a pressure $p_3$ at a temperature $T_2$, with the particles foaming, d2: cooling of the mould interior to a temperature $T_3$, and d3: opening and withdrawal of the rigid foam core.

One particular advantage of this embodiment is that the foaming can be carried out within a maximum of 2 minutes, and that process steps a. to d. can be carried out together within a short time span of 5 to 45 minutes, with the possibility of carrying out process step a. in parallel with the other process steps.

A further advantage is found in the uniform temperature distribution within the material at the moment of foaming. This leads to a particularly uniform distribution, and size distribution, of the pores in the final product: unlike in foaming processes of the prior art, the final product exhibits no, or only minimal, density gradients. In foaming processes of the prior art the exterior regions generally foam to a greater extent than internal regions.

The temperature $T_1$ is preferably between 150 and 150° C., more preferably between 180 and 220° C. Pressure $p_1$ in process step C0. and pressure $p_2$ in process step c1. are preferably each between 2 and 20 bar. Temperature $T_2$ is preferably set to a value from 150 to 250° C., particularly preferably from 180 to 220° C. The pressure $p_3$ is preferably from 0.1 to 2.0 bar, particularly preferably from atmospheric pressure to 1.5 bar.

In one particular variant of the process of the invention, process step c1. is carried out before process step C0. In this variant, the particles are pre-heated in the same mould in which foaming takes place in process step d. In this variant the pressure $p_2$ can be selected flexibly, and by way of example it is possible to introduce the material at atmospheric pressure. Preferred over this variant, however, is an implementation of the process of the invention wherein process step c0. is carried out before process step c1.

With this variant implementation it is particularly preferable for the particles in process step C0. to be stored in a reservoir container at temperature $T_1$ and at pressure $p_1$ and thereby preheated. The particles are then introduced batchwise into the mould in process step c1., with the batchwise introduction being followed in each case by the closing of the connection between reservoir container and mould, prior to the release of pressure in process step d1.

It has proved to be especially favourable to store the matrix particles in the reservoir container, prior to the addition in process step c1., at a temperature which is less than 50° C. below the foaming temperature, and at a pressure which is at least 1 bar above atmospheric pressure, and to introduce them batchwise into the mould in process step c1., the batchwise introduction being followed in each case by the closing of the connection between reservoir container and mould.

Additionally or alternatively it has proved to be very advantageous, and to have an accelerating effect on the process, for the particles in process step c1. to be drawn under suction and/or blown into the cavity within the mould.

The pressure $p_2$ in process step c1. here is derived from the pressure in the particle feed system, such as in a reservoir container, the pressure in the empty mould, and the pressure changes resulting from suction and/or blowing apparatus. A necessary feature in the design of the parameters for process step c1., in accordance with the invention, is that all of these parameters are set in such a way that $p_2$ is not more than 10% below $p_1$ or even is above $p_1$. Excessively rapid foaming of particles is thus suppressed.

Furthermore, it is advantageous in process step c1. for the mould to be filled to a filling level of between 50% and 100%, preferably between 75% and 98%, with particles. In this context, 100% fill level means that the particles are charged to the mould until they reach the uppermost edge thereof. Between the particles here there are naturally unoccupied spaces remaining, the size of which depends on the particle size and the particle shape. Said unoccupied spaces can theoretically constitute up to 50% of the space within the mould, even when the fill level is 100%. Said unoccupied spaces are finally closed by the foaming in process step c. and a homogeneous rigid foam core is thus formed.

Prior to process step b., the interior of the mould may be equipped not only with the filling core but also with what are called inserts. During the introduction of the granules in process step c., these inserts are initially surrounded by the granules and as a result are enclosed wholly or partly by the foam matrix in the subsequent rigid foam core, as an integral constituent of this workpiece. These inserts can by way of example be items with an internal screw thread. Said internal screw thread can be used subsequently to form screw-thread connections to the rigid foam cores. Analogously it is also possible to incorporate pins, hooks, tubes or the like. During the production of the rigid foam core it is also possible to integrate electronic chips or cables into said core.

With regard to the matrix particles used in process step c., the invention provides for various preferred embodiments.

In one first embodiment, the matrix particles constitute ground material composed of a rigid foam polymer, more particularly P(M)I sheet polymer, which is obtained as a cast polymer. Said sheets can by way of example be comminuted in a mill to give suitable particles. Ground matrix particles in this variant are used preferably with a particle size of between 1.0 and 4.0 mm.

In one preferred variant of the invention, these matrix particles are pre-foamed before being introduced into the mould in process step c. Care has to be taken here that the prefoaming is not carried out to completion, but instead is carried out only until the degree of foaming is from 10% to 90%, preferably from 20% to 80%. Final full foaming then takes place in process step d. In this variant, pre-foamed matrix particles having a particle size of between 1.0 and 25.0 mm are used with preference. The pre-foamed matrix particles preferably have a density of between 40 and 400 kg/m$^3$, preferably between 50 and 300 kg/m$^3$, more preferably between 60 and 220 kg/m$^3$, and especially preferably between 80 and 220 kg/m$^3$. One particularly suitable process for the pre-foaming of P(M)I is described in the German patent application having the application file reference 102013225132.7, for example.

In a third embodiment of the process, the matrix particles comprise rigid foam suspension polymers, preferably P(M)I suspension polymers. It is preferable to use suspension polymers of this type with a particle size from 0.1 to 1.5 mm, particularly preferably from 0.1 to 1.0 mm. The production of P(M)I suspension polymers can by way of example be found in the international application with file reference PCT/EP2014/050658.

In a fourth embodiment of the process of the invention, pre-foamed suspension polymers are used in process step c. As far as the degree of foaming is concerned, the same comments apply as those described above for the pre-foamed matrix particles of a ground material. The pre-foamed matrix particles preferably have a density of between 40 and 400 kg/m$^3$, preferably between 50 and 300 kg/m$^3$, more preferably between 60 and 220 kg/m$^3$ and especially preferably between 80 and 220 kg/m$^3$. These prefoamed suspension polymers are preferably used with a particle size of from 0.1 to 2.0 mm, particularly from 0.2 to 1.5 mm.

In the process of the invention, during the first half, preferably during the first quarter, of the duration of process step d., it is possible for hot air, a hot gas or steam, preferably a hot inert gas or air, to be introduced into the interior of the mould. The temperature of this introduction is between 90 and 300° C., preferably between 150 and 250° C.

Relative to other prior art, mouldings or foam materials having a significantly more homogeneous pore structure and without defects can be produced, at the same time in more complex shapes, by means of a process based on pressure-release foaming. With this process, moreover, it is possible for these complex shapes to be produced rapidly, in short cycle times and with particularly good quality. In particular, when the process of the invention is compared with prior-art processes it has shorter heating and cooling cycles. The present process has the great advantage over the prior art, moreover, that it is sufficiently gentle not to damage the surface of the matrix particles.

In one particular embodiment of the process of the invention it is possible for the insides of the mould shells to be lined before process step b. or c. with a material which forms a later outer layer, preferably with prepregs or organopanels. Also possible is the introduction, for example, of decorative foils or metals. The foils, metals, prepregs or organopanels may optionally have been coated with an adhesive or with an adhesion promoter. During the foaming in process step d., the foam that is formed then bonds to the coated or uncoated films, metals, prepregs or organopanels, which therefore form outer layers. By means of a procedure of this kind, the rigid foam core in process step d. is withdrawn in the form of a composite material with outer layers.

Alternatively or additionally to this, it is also possible for the outside of the filling core to be lined before process step b. or c. with an analogous material that forms a later outer layer, preferably with prepregs or organopanels.

The wording "forms a later outer layer" here means preferably that the organopanel or prepreg in question is one which cures in parallel under the foaming conditions.

Regarding process steps e. and f., the following aspects may also be highlighted:

Should the filling core be entirely closed, it must be opened at one or more locations accessible on the outside of the material. The withdrawal of the particles in process step f. then takes place at its most simple by pure shaking out, with the particles being suitable for subsequent re-use in general. Under certain circumstances it is necessary for the withdrawal in process step f. to be assisted, for example, by shaking, blowing out, poking or striking.

Optionally, and particularly depending on the film material and on the geometry of the cavity, the foil may be extracted from the rigid foam core after process step f. Should this not be possible or not be desirable, the foil may also remain within the cavity without any significant contribution to weight.

It is moreover possible to use adhesion promoters to improve adhesion between foam core material and outer layers, where said adhesion is significant in subsequent steps for the production of composite materials. These adhesion promoters may also have been applied on the surface of the matrix particles, even prior to the pre-foaming of the invention, in an alternative to application in a later process step. In particular, polyamides or poly(meth)acrylates have proved to be suitable as adhesion promoters. However, it is also possible to use low-molecular-weight compounds which are known to the person skilled in the art from the production of composite materials, in particular as required by the matrix material used in the outer layer.

In particular, the process of the invention has the great advantage that it can be carried out very rapidly and therefore in combination with downstream processes with very low cycle times. The process of the invention can therefore be integrated very successfully within a mass production system.

The process parameters to be selected for the entire process of the invention depend on the design of the system used in any individual case and the design thereof, and also on the materials used. The person skilled in the art can readily determine these with use of a few preliminary experiments.

In accordance with the invention it is also possible for the intermediate after process step d., comprising the filling core, to be stored and/or first to be subjected to further finishing steps, such as adhesive bonding, installation, equipping with outer layers, polishing, cutting or sawing, for example. The particles from the filling core may in that case optionally not be removed until afterwards, in process steps e. and f. This provides the foam material with additional stabilization during further processing and/or storage.

The material used in accordance with the invention is preferably P(M)I, more particularly PMI. P(M)I foams of this kind feature exceptional strength. The P(M)I foams are normally produced in a two-stage process: a) production of a cast polymer, and b) optional partial foaming of this cast polymer. In accordance with the prior art, these are then cut or sawn to give the desired shape. An alternative which has not so far become widely accepted in industry is the in-mould foaming process mentioned, and the process of the invention can be used for this.

Production of the P(M)I begins with production of monomer mixtures which comprise (meth)acrylic acid and (meth) acrylonitrile, preferably in a molar ratio of from 2:3 to 3:2 as main constituents. Other comonomers can also be used, examples being esters of acrylic or methacrylic acid, styrene, maleic acid and itaconic acid and anhydrides thereof, and vinylpyrrolidone. However, the proportion of the comonomers here should not be more than 30% by weight. It is also possible to use small amounts of crosslinking monomers, e.g. allyl acrylate. However, the quantities should preferably be at most from 0.05% by weight to 2.0% by weight.

The copolymerization mixture moreover comprises blowing agents which at temperatures of about 150 to 250° C. either decompose or vaporize and thus form a gas phase. The polymerization takes place below this temperature, and the cast polymer therefore comprises a latent blowing agent. The polymerization advantageously takes place in a slab mould between two glass plates.

The production of semifinished PMI products of this type is known in principle to the person skilled in the art and can be found by way of example in EP 1 444 293, EP 1 678 244 or WO 2011/138060. Semifinished PMI products that may in particular be mentioned are those marketed in foamed form with the trademark ROHACELL® by Evonik Industries AG. Semifinished acrylimide products (semifinished PI products) can be considered to be analogous to the PMI foams in relation to production and processing. However, acrylimide foams are markedly less preferred than other foam materials for toxicological reasons.

In a second variant of the process of the invention, the P(M)I particles are suspension polymers which can be introduced directly per se into the process. The production of suspension polymers of this kind may be found in references including DE 18 17 156 or WO 2014/124774, for example.

Alternatively to P(M)I, however, it is also possible in accordance with the invention for other foams to be used, especially rigid foams, such as PP, PET, PE, PVC or rigid PU foams, for example. Adapting the process to these foams is accomplished via the process parameters specifically required in each case during foaming, and is something which it is easy for the skilled person to bring about.

The sandwich materials comprising a foam core, or foam bodies, that are produced in accordance with the invention are likewise part of the present invention and are notable in particular for the fact that they have a cavity connected at not less than one location to the surface of the foam core. This location accounts preferably for between 1 and 10 area percent of the surface. Optionally this location may subsequently be closed with an outer material by means of adhesive bonding, sewing, pinning or bolting. Also possible is the placement of a prepreg or organopanel and its curing. These products moreover have optionally been provided with the inserts described above.

Furthermore, these foam bodies or foam cores, between the inner surface of the foam and the cavity, have a foil, a cured prepreg or organopanel, or nothing at all. The products in question are preferably rigid P(M)I foam cores in sandwich materials, or P(M)I foam bodies.

The rigid foam core may preferably have a complex shape. The surface of a foam body of the invention here is enclosed to an extent of at least 95% by a skin which consists of the rigid foam material and which preferably has a thickness of at least 100 μm. This means that these innovative rigid foam cores or bodies have no open pores on the surface and therefore feature particular stability, with respect to impacts or strikes, for example, relative to the prior-art materials even without an additional outer layer.

These materials are novel per se, i.e. irrespective of the process of the invention, and are therefore equally provided by the present invention.

These innovative rigid foam cores preferably have a density of between 20 and 180 kg/m$^3$. This density FIGURE relates to a hollow foam body including cavity, the opening of which has been actually or conceptually closed.

The foamed foam bodies produced in accordance with the invention may undergo further processing, for example, to give foam core composite materials. The foam bodies or foam core composite materials or sandwich materials of the invention may find application in particular in mass production, by way of example for bodywork construction or for interior trim in the motor vehicle industry, for interior parts in rail vehicle construction or shipbuilding, in the aerospace industry, in mechanical engineering, in the manufacture of sports equipment, in furniture construction or in the construction of wind turbines. The rigid foam cores of the invention are generally suitable in principle for any type of lightweight construction.

The invention claimed is:

1. A process for producing at least one complex rigid foam core, the process comprising:
producing a filling core, filled with particles and consisting of a foil,
inserting the filling core into a mold and then closing the mold,
introducing matrix particles into a cavity between the filling core and an inside wall of the mold,
foaming the matrix particles, opening the mold, and withdrawing a rigid foam core,
optionally opening the foil at an accessible former contact region from the inserting, and
withdrawing the particles from the rigid foam core,
wherein the matrix particles are pre-foamed P(M)I particles having a particle size between 1.0 and 25.0 mm or are P(M)I suspension polymers having a particle size between 0.1 and 1.0 mm.

2. The process according to claim 1,
wherein the inserting comprises inserting the filling core such that the filling core contacts between 0.5 and 10 area percent of the inside wall of the mold.

3. The process according to claim 1,
wherein the inserting comprises inserting the filling core such that the filling core after the foaming is entirely surrounded by foam, and
in the optionally opening, the foam is partly drilled open or cut open for withdrawal of the particles in the withdrawing.

4. The process according to claim 1,
wherein in the inserting, the filling core is inserted such that the filling core contacts between 0.5 and 10 area percent of the inside wall of the mold, which is sealed with a readily removable means, and
the readily removable means is removed in the optionally opening.

5. The process according to claim 1,
wherein the particles comprise sand, polymer particles which are solid and stable at a foaming temperature, metal particles or glass beads.

6. The process according to claim 1,
wherein the foil is a PTFE, PEEK or PPSU foil or is a silicone-containing paper or a silicone-containing foil, and
the foil is optionally extracted from the rigid foam core after the withdrawing.

7. The process according to claim 1,
wherein in the producing, the filling core is tightly packed and shaped by pressing and/or by applying a subatmospheric pressure.

8. The process according to claim 1,
wherein the filling core is open at one location where the filling core is placed hanging into the mold.

9. The process according to claim 1,
wherein the inside of the mold is lined before the inserting or the introducing, with a material forming a later outer layer.

10. The process according to claim 1,
wherein the outside of the filling core is lined before the inserting or the introducing, with a material forming a later outer layer.

11. The process according to claim 1,
wherein in the inserting, the filling core is inserted such that the filling core contacts the inside wall of the mold at not less than two locations, and
in the withdrawing, the particles are blown out of the cavity with compressed air.

12. The process according to claim 1,
wherein in the introducing, the matrix particles are introduced in preheated form under pressure, and
the foaming takes place at a foaming temperature by lowering of a pressure.

13. The process according to claim 1,
wherein in the introducing, the matrix particles are introduced into the mold by suction, blowing, or both suction and blowing.

14. The process according to claim 1,
wherein the cavity is filled in the introducing, to a filling level of between 50% and 100% with matrix particles.

15. The process according to claim 1,
wherein before the introducing, the matrix particles are stored in a reservoir container at a temperature which is less than 50° C. below a foaming temperature and at a pressure which is at least 1 bar above atmospheric pressure, and
in the introducing, the matrix particles are introduced batchwise into the mold, a connection between the reservoir container and the mold being closed after each batchwise introduction.

16. A foam body or sandwich material, comprising:
a foam core,
wherein the foam body or sandwich material has a cavity connected at not less than one location to a surface of the foam core,
between the foam core and the cavity, there is a foil, a cured prepreg or organopanel, or nothing at all, and
the foam core is obtained by the process according to claim 1.

17. The process according to claim 9, wherein the material is a prepreg or an organopanel.

18. The process according to claim 10, wherein the material is a prepreg or an organopanel.

* * * * *